(12) United States Patent  
Chattopadhyay et al.

(10) Patent No.: US 7,899,432 B2
(45) Date of Patent: Mar. 1, 2011

(54) SUBMILLIMETER WAVE HETERODYNE RECEIVER

(75) Inventors: Goutam Chattopadhyay, Pasadena, CA (US); Harish Manohara, Arcadia, CA (US); Peter H. Siegel, LaCananda, CA (US); John Ward, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 576 days.

(21) Appl. No.: 12/070,212

(22) Filed: Feb. 15, 2008

(65) Prior Publication Data

US 2008/0280583 A1 Nov. 13, 2008

Related U.S. Application Data

(63) Continuation of application No. 11/820,489, filed on Jun. 19, 2007, now abandoned.

(60) Provisional application No. 60/814,731, filed on Jun. 19, 2006.

(51) Int. Cl.
*H04B 1/26* (2006.01)

(52) U.S. Cl. ............... 455/327; 455/323; 455/324; 333/26

(58) Field of Classification Search ............... 455/327, 455/323, 324; 333/326
See application file for complete search history.

(56) References Cited

U.S. PATENT DOCUMENTS

| 4,673,897 | A  | * | 6/1987 | Chua et al. ............... 333/26 |
| 7,095,292 | B2 | * | 8/2006 | Sayanagi et al. .......... 333/26 |
| 7,804,443 | B2 | * | 9/2010 | Nagaishi et al. ........... 342/70 |

* cited by examiner

*Primary Examiner*—Sanh D Phu
(74) *Attorney, Agent, or Firm*—Milstein Zhang & Wu LLC; Joseph B. Milstein (57) ABSTRACT

In an embodiment, a submillimeter wave heterodyne receiver includes a finline ortho-mode transducer comprising thin tapered metallic fins deposited on a thin dielectric substrate to separate a vertically polarized electromagnetic mode from a horizontally polarized electromagnetic mode. Other embodiments are described and claimed.

15 Claims, 8 Drawing Sheets

SUBMILLIMETER WAVE HETERODYNE RECEIVER

BENEFIT OF PROVISIONAL APPLICATION

This application is a continuation of and claims the benefit of U.S. patent application Ser. No. 11/820,489, filed 19 Jun. 2007, which claims the benefit of U.S. Provisional Application No. 60/814,731, filed 19 Jun. 2006.

GOVERNMENT INTEREST

The invention described herein was made in the performance of work under a NASA contract, and is subject to the provisions of Public Law 96-517 (35 USC 202) in which the Contractor has elected to retain title.

FIELD

Embodiments relate to radio frequency receivers and waveguide structures.

BACKGROUND

Dual-polarized, sideband-separating, balanced receivers are well known and have been used extensively at microwave and millimeter-wave frequencies. However, it is presently believed that receivers based on prior art designs may not operate well at frequencies at or above 1 THz. Only recently, sideband-separating balanced receivers have been designed for frequencies beyond W-band (75-110 GHz). For example, receiver architectures have been proposed for frequencies up to 900 GHz for the Atacama Large Millimeter/Submillimeter Array (ALMA).

Dual-polarized receivers detect both polarizations of incoming radiation. When both polarizations are received simultaneously, there is a $\sqrt{2}$ improvement in signal-to-noise ratio (SNR), or a factor of two reduction in observing time. In some prior art applications, dual polarization operation may be achieved by using a wire-grid polarizer to split the telescope beam into two polarizations. The output of a local oscillator (LO) may be injected using a beamsplitter, either after the polarizer, in which case two beamsplitters are used; or before the polarizer, where a single, correctly oriented beamsplitter is used. Either approach leads to fairly complicated optical designs, especially for receivers with multiple bands or multiple pixels.

Most submillimeter-wave receivers in radio astronomy currently use double-sideband (DSB) mixers to down convert an RF (Radio Frequency) signal to an intermediate frequency. DSB mixers are useful for continuum observations, where the signals from both sidebands are equally important. However, for spectral line observations, the presence of the down-converted signals from the unwanted image band may degrade receiver sensitivity and calibration certainty. Therefore, sideband-separating receivers with good image rejection capability are desirable for high resolution spectral line observations. Moreover, sideband-separating receivers with good image rejection may mitigate confusion from spectra in the image sideband, and may mitigate calibration uncertainty from sideband imbalance.

Balanced mixers use two or more detector elements in a balanced configuration to help suppress local oscillator amplitude modulation (AM) noise, help provide better power handling capabilities than unbalanced mixers, and help reject certain spurious responses and spurious signals. By simplifying LO injection and eliminating the need for diplexers, balanced mixers are desirable components for scaling receivers to multi-pixel arrays.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Described are embodiments for a submillimeter-wave heterodyne receiver for providing dual-polarized, sideband-separating, and balanced output signals. In practice, a plurality of embodiments may be configured into a multi-pixel receiver array. Embodiment receivers may be fabricated utilizing silicon micromachining, utilizing deep reactive ion etching (DRIE) processes. It is expected that such manufacturing techniques may yield components working up to 6 THz. For example, embodiments are expected to provide relatively compact broadband, dual-polarized, sideband-separating, balanced receivers operational at 1.5 THz with more than a 40% fractional bandwidth.

Figure 1:
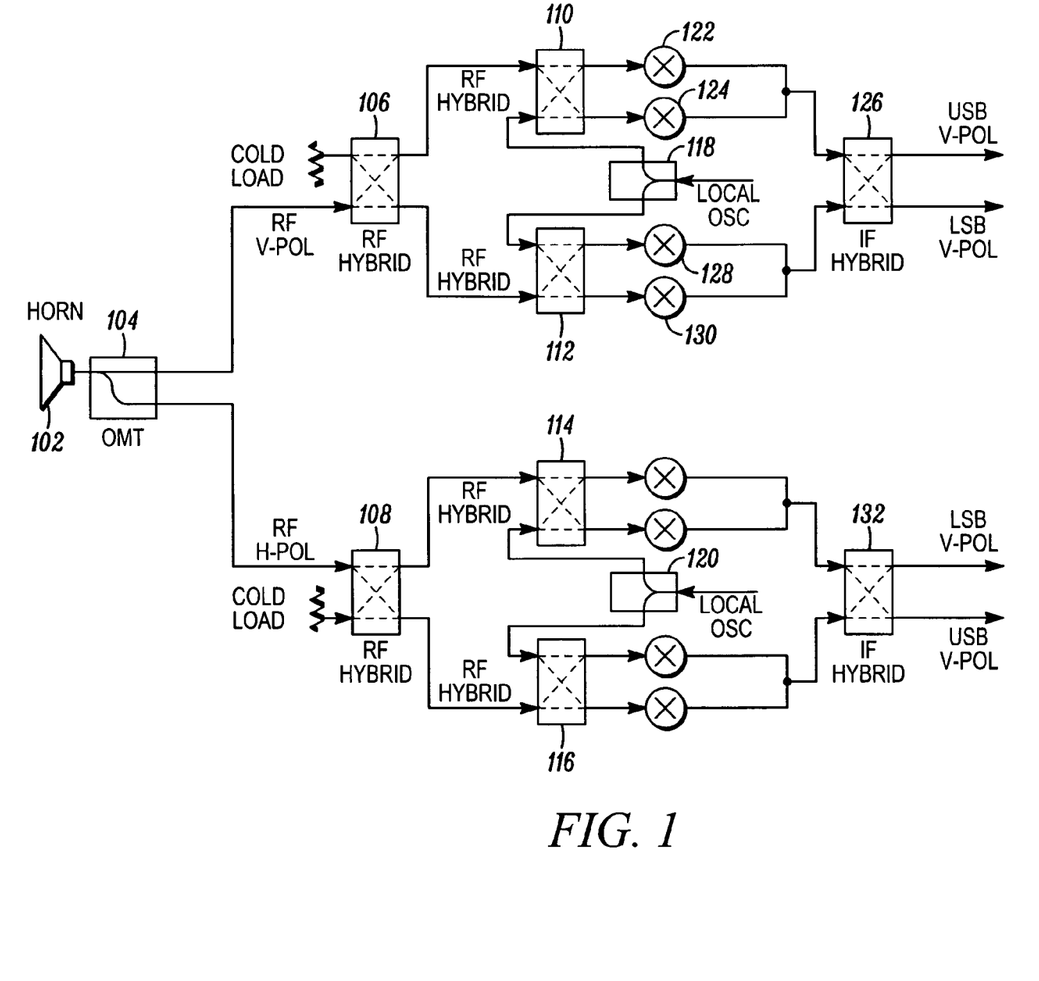
FIG. 1 illustrates a receiver architecture with an embodiment ortho-mode transducer.

A receiver according to an embodiment is illustrated in FIG. 1 at a high block diagram level. An electromagnetic signal is received at horn antenna 102. Coupled to horn 102 is ortho-mode transducer (OMT) 104, followed by six quadrature hybrids: 106, 108, 110, 112, 114, and 116. OMT 104 separates the two orthogonal polarizations of the received electromagnetic signal, with one of the two polarizations (e.g., the vertical polarization) provided to quadrature hybrid 106 and the other polarization (e.g., the horizontal polarization) provided to quadrature hybrid 108.

A quadrature hybrid comprises four ports, and may be used in various ways for summing and phase shifting electromagnetic signals. For example, two ports may serve as input ports and two ports may serve as output ports, where for complex-valued input amplitudes A and B, the output signals may be modeled as $A/\sqrt{2}+jB/\sqrt{2}$ and $B/\sqrt{2}-jA/\sqrt{2}$, where j denotes a phase rotation of $\pi/4$ (90°). For quadrature hybrid 106, one of its ports is terminated by a cooled matched impedance load (labeled "cold load"), so that for an input amplitude A, the output port of hybrid 106 that is coupled to quadrature hybrid 110 provides $jA/\sqrt{2}$ and the output port of hybrid 106 that is coupled to quadrature hybrid 112 provides $A/\sqrt{2}$. In practice, there may be an additional phase shift applied to both output signals, but this is not important and is left out for convenience. The termination load for hybrid 106 is cooled to reduce thermal noise. Similar remarks apply to quadrature hybrids 108, 114, and 116.

Local oscillator 118 provides a sinusoidal signal to one of the input ports of quadrature hybrid 110. The frequency of local oscillator 118 is chosen so that the frequency difference to ω−f, where ω is the frequency of the received electromagnetic signal and f is the frequency of the local oscillator, is some desired intermediate frequency. Although not explicitly shown, a bandpass filter, centered about the intermediate frequency, follows mixer 122, and similarly for mixer 124. The output signals from these bandpass filters are summed and provided to an input port of quadrature hybrid 126. Similarly, local oscillator 118 is also coupled to an input port of hybrid 112, whose output ports are coupled to mixers 128 and 130. The outputs of mixers 128 and 130 are bandpass filtered and summed, and provided to an input port of quadrature hybrid 126.

For some applications, the output signals at the output ports of quadrature hybrid 126 are, expect perhaps for an algebraic sign or an overall phase shift, the upper and lower sideband components of the received electromagnetic signal after shifting down to the intermediate frequency. Accordingly, the output ports of quadrature hybrid 126 are labeled in FIG. 1 as "USB V-POL" and "LSB V-POL", where the "V-POL" denotes vertical polarization, "USB" denotes upper sideband, and "LSB" denotes lower sideband.

For example, for a received signal modeled as $A\cos(\omega t+\theta(t))$, where ω is the carrier frequency and the phase modulation θ(t) is a relatively slowly varying function of time, the output signals at USB and LSB represent (up to an overall phase factor or algebraic sign) the upper sideband and lower sideband components, respectively, of $A\cos(\omega t+\theta(t))$ when shifted down to an intermediate frequency. Such a signal model may be appropriate in CW (Continuous Wave) radar systems, where $A\cos(\omega t+\theta(t))$ is a received signal from a scatterer.

For many communication systems, the received signal may be expressed as $x_I(t)\cos(\omega t)+x_Q(t)\cos(\omega t)$, where in general the inphase and quadrature components $x_I(t)$ and $x_Q(t)$ are independent of each other, unlike the inphase and quadrature components of $A\cos(\omega t+\theta(t))$. Then a more general statement is that the output signals at the output ports of quadrature hybrid 126 are the inphase and quadrature components (up to an overall phase factor or algebraic sign) of the received signal when shifted down to the intermediate frequency. Stated in another way, these output signals are related to each other by the Hilbert transform (up to an overall phase factor or algebraic sign). The particular time dependence of the inphase and quadrature components $x_I(t)$ and $x_Q(t)$ depends upon the chosen modulation scheme for the communication system.

The above discussion for the signal processing of the vertical polarization also is applicable to the signal processing chain applied to the horizontal polarization. For some embodiments, local oscillator 120 may be the same oscillator as local oscillator 118.

It should be noted that once the signals have been shifted to the intermediate frequency, the functions of quadrature hybrids 126 and 132 may be implemented in the digital domain after digital-to-analog conversion. Furthermore, post processing of the output signals from quadrature hybrids 126 and 132 may be performed in the digital domain.

An embodiment uses a diagonal horn (102), comprising a square waveguide (e.g., 150 µm×150 µm) to accept all polarizations. In one particular embodiment, the horn aperture may be set at 1.27 mm with a 6° semi-flare angle. Horn 102 may be fabricated with DRIE-based silicon micromachining, where gradient thickness photoresist masking layers may be used to achieve gradient depths of etching in the longitudinal direction. The wafer (substrate) in which horn 102 is integrated may be mounted on a 45° tilted stage during the DRIE process to achieve the required profile in the transverse dimension.

Figure 2:
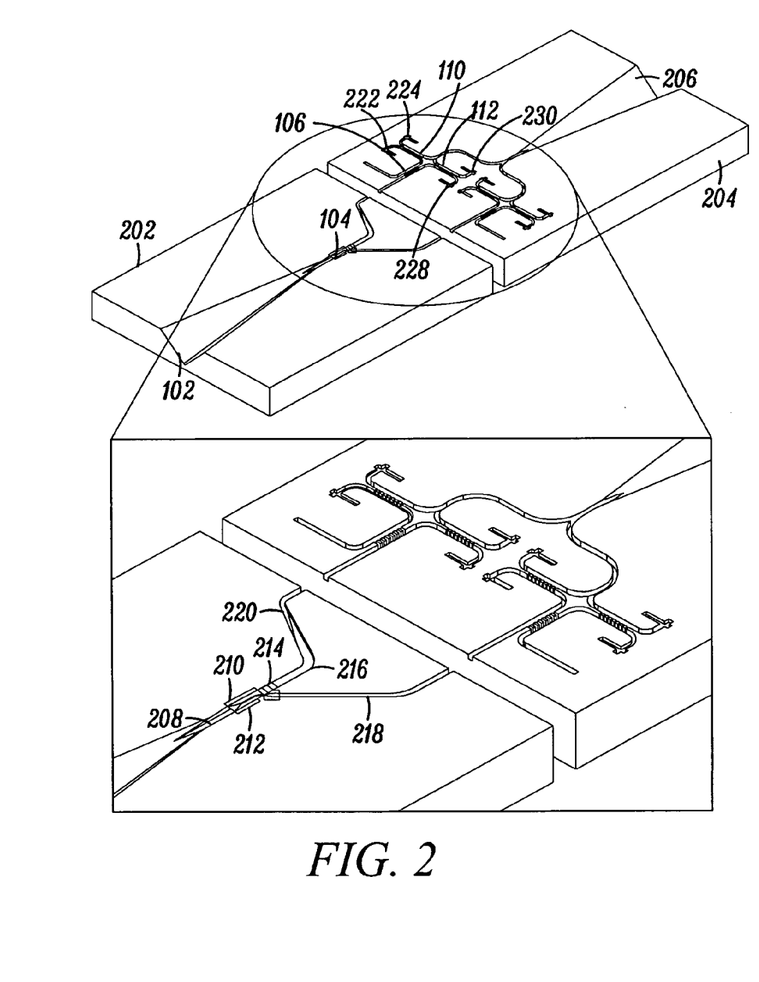
FIG. 2 illustrates a receiver structure according to an embodiment.

Optical lithography and a DRIE-based silicon micromachining process may be used to fabricate the horn antenna, OMT, and quadrature hybrids to achieve micron-size waveguide features and sub-micron tolerances, and to achieve planar integration of these components. FIG. 2 illustrates planar integration on a substrate for some of these components.

FIG. 2 illustrates what may be called split-block integration. Blocks 202 and 204 serve as a substrate for the fabrication of various receiver components. For some embodiments, blocks 202 and 204 may be silicon in which various structures have been etched, and where a good conductor, such as gold, is deposited. In operation, these blocks are joined together at their edges. Some of these structures etched into these blocks and covered with a deposited conductor may be thought of as representing the "bottom half" of various receiver components, where other blocks (not shown) are also etched and then deposited with a conductor to form the "top half" of these receiver components. The top and bottom halves are then joined together to complete these receiver components. This will be discussed in more detail later. For some embodiments, the fabrication need not be split among two bottom half blocks, so that a single block (substrate) is etched to form a single bottom half instead of using two blocks (e.g., blocks 202 and 204) to form the bottom half.

For convenience, we take the convention that the horizontal polarization is parallel to the plane of blocks 202 and 204, so that the vertical polarization is perpendicular to this plane. However, this convention is arbitrary, so it is to be understood that the terms horizontal and vertical do not necessarily correspond to the actual physical horizontal and vertical orientations of the final assembled receiver.

For ease of discussion, labels that are used for various receiver components in FIG. 1 are also used in FIG. 2 for the corresponding receiver components. For example, etch structure 102 in FIG. 2 represents the bottom half of horn antenna 102 in FIG. 1. Label 104 in FIG. 2 identifies OMT 104 in FIG. 1. More precisely, label 104 in FIG. 2 illustrates a portion of OMT 104 that is fabricated on block 202, not the entire OMT, but for ease of discussion this distinction is not made when referring to label 104 in FIG. 2. Similar remarks apply to the other receiver components, keeping in mind that blocks 202 and 204 provide only the bottom half of the integration of the receiver components. Because of the obvious symmetry, not all components in FIG. 2 need be labeled, for the correspondence between the components for the horizontal polarization processing chain and that of FIG. 1 should be clear.

Cavities 222, 224, 228, and 230 indicate where mixers 122, 124, 128, and 130 may be placed. Structure 206 represents the bottom half of a waveguide to guide the sinusoidal output of local oscillator 118 to quadrature hybrids 110, 112, 114, and 116.

FIG. 2 illustrates an enlargement of portions of blocks 202 and 204. As indicated in the enlargement, OMT 104 is a finline OMT comprising square waveguide 208 fitted with thin tapered conductive (e.g., metallic) fins 210 and 212. Following OMT 104 in FIG. 2 is transformer 214 comprising through-arm transitions from a square waveguide to a full-height rectangular waveguide by way of three etched steps. Waveguide 216 guides the vertical polarization and waveguide 218 guides the horizontal polarization, as should be clear by comparing FIG. 2 with the architecture of FIG. 1. Following waveguide 216 is waveguide twist 220 to rotate the polarization of the transverse electric field vector spatially by 90° so that the electromagnetic signal provided to the rest of the circuit has a polarization parallel to blocks 202 and 204, just as for the electromagnetic signal in waveguide 218. In this way, the same fabrication techniques may be used for both signal processing chains for the two received polarizations. The structure of OMT 104 and waveguide twist 220 will now be described in more detail.

Figure 3A:
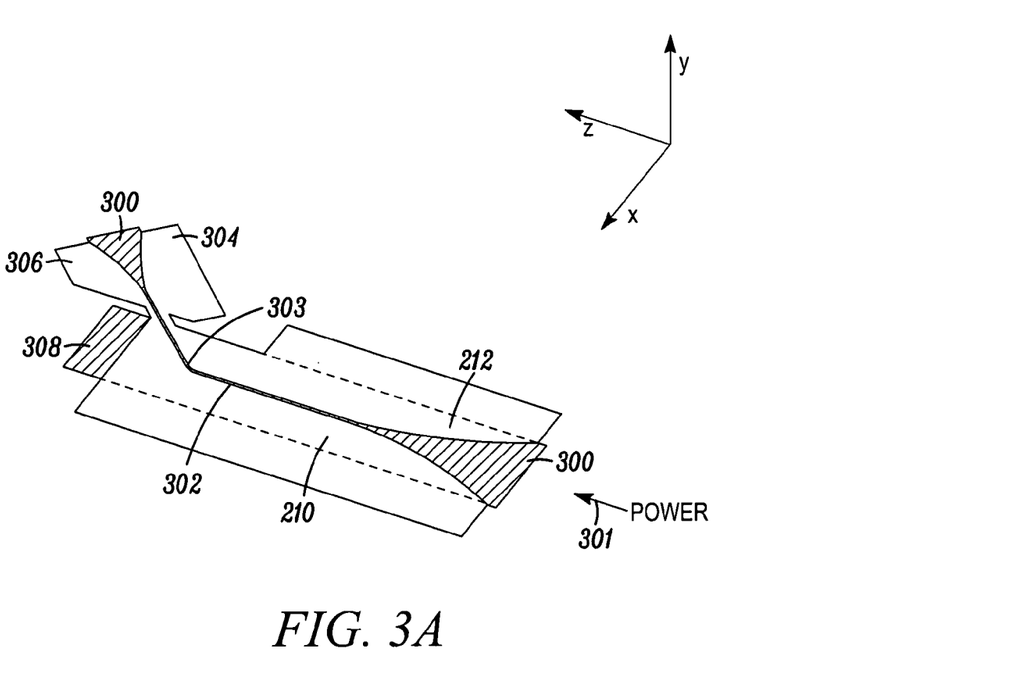
FIGS. 3A and 3B illustrate perspective views of an ortho-mode transducer according to an embodiment.
Figure 3B:
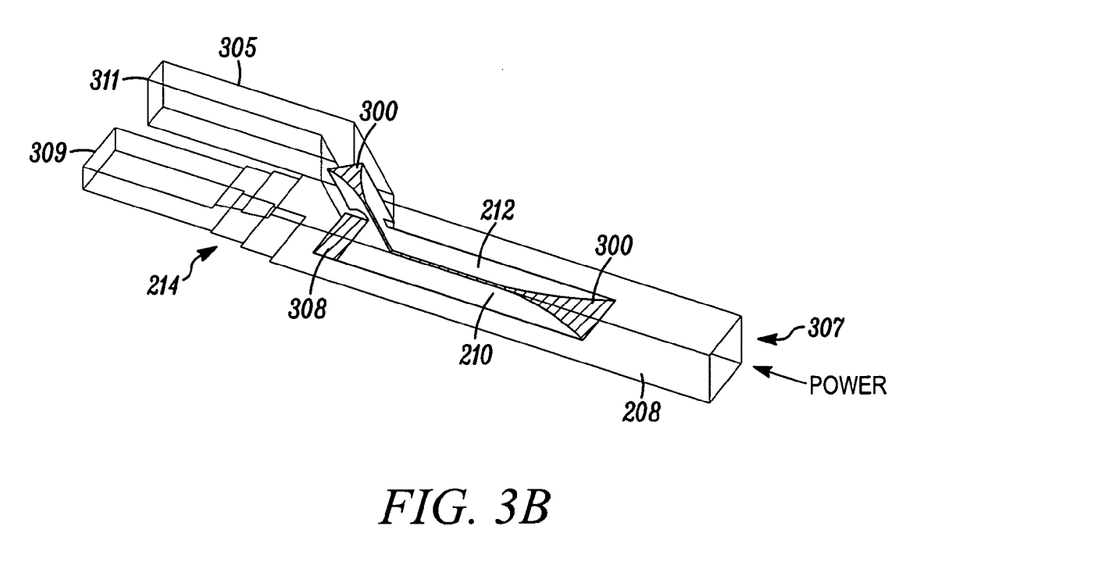

FIGS. 3A and 3B illustrate a simplified perspective view of OMT 104, comprising fins 210 and 212. The coordinate system illustrated in FIGS. 3A and 3B serves as a reference because later figures will illustrate the receiver components from different perspectives. For ease of illustration, block 202 is not shown. As will be discussed in more detail later, fins 210 and 212 are formed on a thin dielectric substrate or membrane, labeled 300 in FIGS. 3A and 3B.

The power flow direction of the input electromagnetic signal is indicated in FIG. 3A by arrow 301, which is taken in the direction of the z-axis. This input electromagnetic signal is provided by horn 102, and comprises the two orthogonal polarizations, where the vertical polarization as referred to in FIG. 1 is along the y-axis and the horizontal polarization as referred to in FIG. 1 is along the x-axis. The dominant mode at the input port to the OMT for both of these polarizations is the $TE_{10}$ mode.

The dashed lines in FIG. 3A indicate the edge of waveguide 208 underneath fins 210 and 212. Note that portions of fins 210 and 212 extend outside of the dashed lines. These portions may be referred to as beamleads. The beamleads are positioned adjacent to (that is, on top of) block 202 during assembly. These beamleads are bonded to block 202 where waveguide 208 is etched into block 202, so that fins 210 and 212 are held in place. This bonding may be van der Waal bonding. There is a gap (302) between fins 210 and 212 adjacent to dielectric substrate 300 to propagate a finline mode.

When the top half block is bonded to block 202 to complete the OMT structure with waveguide 208, fins 210 and 212 are positioned in a plane parallel to the x-y plane and gap 302 essentially runs along the center of waveguide 208, follows bend 303, and then out through side-arm 305 (see FIG. 3B). The straight portion of the OMT may be referred to as the through-arm. FIG. 3B provides a wire-grid view of OMT 104 inside waveguide 208, indicating input port 307, output pot 311 for the side-arm, and output port 309 for the through-arm.

The horizontally polarized $TE_{10}$ mode provided at input port 307 to the OMT is parallel to fins 210 and 212 (in the x-axis direction), and gradually transforms to a finline mode as it propagates along the OMT. Its energy is essentially confined to the narrow gap (302) between fins 210 and 212 in the center of waveguide 208. This energy then may be removed from waveguide 208 by curving the finline (narrow gap 302) and bringing it out through a side wall of waveguide 208. This is illustrated by bend 303 and that portion of fins 210 and 212 near labels 304 and 306. The narrow gap starts to widen when the finline mode is guided out of waveguide 208 and through side-arm 305. The finline mode gradually transforms into a $TE_{10}$ mode, where it is guided to the rest of the signal processing chain for the horizontally polarized portion of the received electromagnetic signal.

The vertically polarized $TE_{10}$ mode provided input port 307 to the OMT is orthogonal to fins 210 and 212 (in the y-axis direction), and passes through the OMT essentially unperturbed when the fins are sufficiently thin. Resistive card 308 is used to suppress the excitation of unwanted modes at the termination of the fins in the through-arm of the OMT, and may be fabricated by depositing a resistive film on the same dielectric substrate that the fins are deposited on. For the vertically polarized mode, the through-arm of the OMT transitions from a square cross section input port 307 to a full-height rectangular waveguide at output port 309 by way of three-step matching transformer 214.

For some embodiments, for the horizontally polarized $TE_{10}$ mode, the full-height rectangular side-arm (where fin portions 306 and 304 exit) uses a mitered 45° bend so that both waveguide structures at output ports 309 and 311 may be in the same plane. For some embodiments, a 40% height waveguide iris may be used at the junction between the side-arm and through-arm to minimize the effect of the side-arm opening on the vertical polarization signal, while mitigating disturbance of the finline guide mode for the horizontal polarization.

As can be seen from the previous illustrations, the overall design of the OMT is planar, and by using DRIE-based silicon micromachining techniques, it is expected that operation at THz frequencies is feasible. This structure, however, suffers from somewhat higher loss than the so-called Beifot type designs due to Ohmic losses in the fins. Fortunately, the resistive losses in a normal metal fin may be reduced if quantum-limited mixers are operated at cryogenic temperatures.

Figure 4:
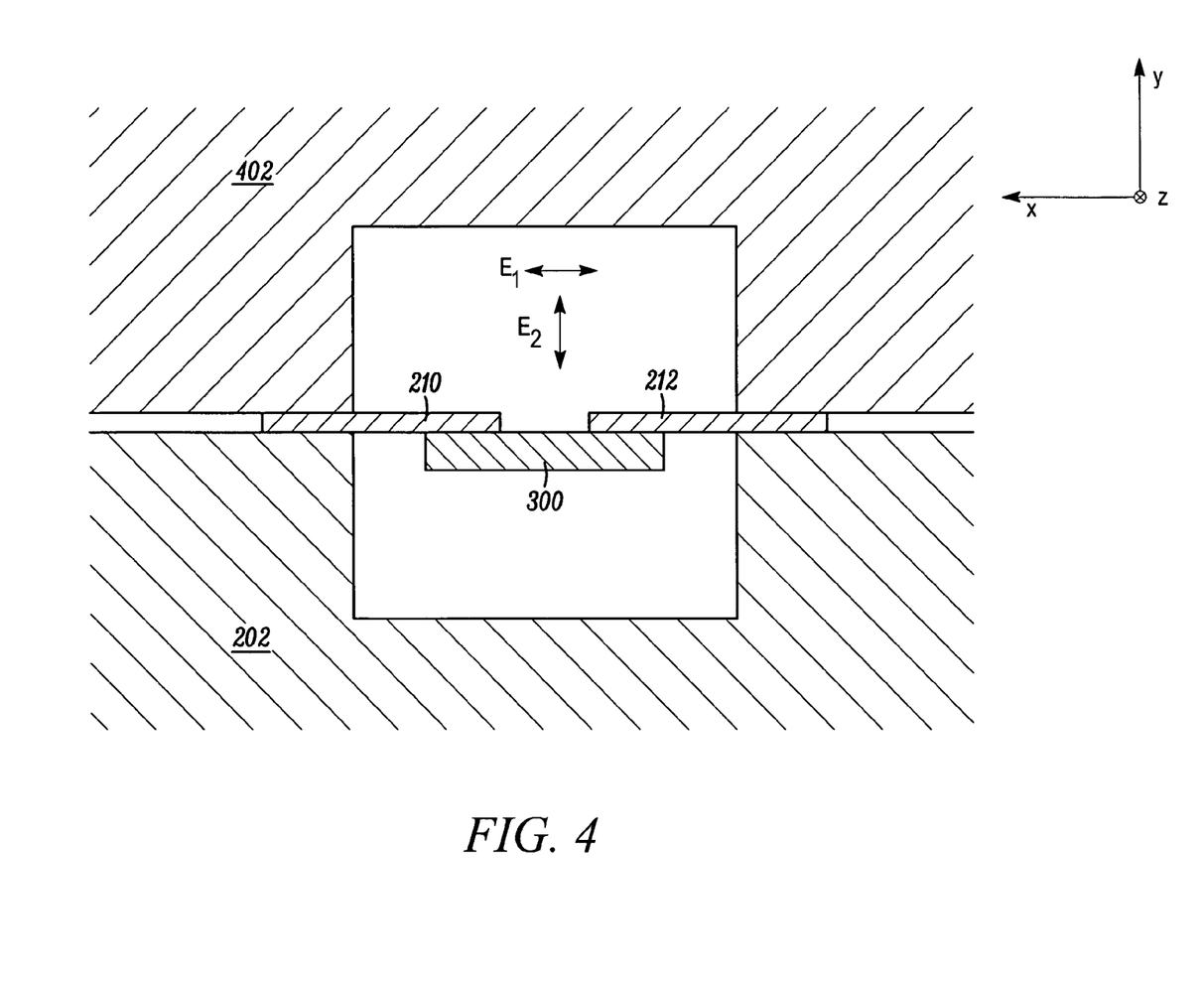
FIG. 4 illustrates a cross sectional view of an ortho-mode transducer according to an embodiment.

Some embodiments may use metallic fins photolithographically etched on a thin silicon dielectric substrate. This is illustration in FIG. 4, which provides a simplified cross sectional view of OMT 104. The orientation of the coordinate axes is illustrated in FIG. 4, where the z-axis points into the page of the illustration, so that the illustration in FIG. 4 is a slice of the illustration in FIG. 3B in a plane perpendicular to the z-axis close to the input port of the OMT. The polarizations of the two electric fields are shown, where electric field $E_1$ has a horizontal polarization (in the x-axis direction) and electric field $E_2$ has a vertical polarization (in the y-axis direction). Top half block 402 is bonded to bottom half block 202 by van der Waal forces to complete the OMT and waveguide structure.

FIG. 4 shows a gap between half blocks 402 and 202 due to the thickness of fins 210 and 212. However, in practice, for some embodiments fins 210 and 212 are about 1 micron thick, so that when half blocks 402 and 202 are put together, they squeeze down fins 210 and 212 without leaving a gap.

Fins 210 and 212 may be fabricated by depositing metal on dielectric substrate 300, followed by etching to produce the desired shape of the fins. For some embodiments, the dielectric substrate may be silicon-on-insulator (SOI), or for example GaAs (Gallium Arsenide), and may have a thickness from 2 to 3 µm. The choice for the width of the finline gap (302) depends upon the operating frequency. For example, for some embodiments, the gap may be 25 µm for a carrier frequency of 100 GHz, and may scale accordingly, where for example the gap may be 2.5 µm for 1 THz.

A single gold metallization layer may be deposited on the SOI substrate and etched to form the fins. The beamleads may be formed from backside processing by etching away the SOI substrate using a separate mask. For example, free-standing metallic beamleads have been discussed in G. Chattopadhyay, et al., "An All-Solid-State Broad-Band Frequency Multiplier Chain at 1500 GHz," IEEE Trans. Microwave Theory Tech., vol. 52, no. 5, pp. 1538-1547, May 2004. These beamleads are relatively mechanically strong, reliable, and are expected to provide very good grounding when mounted between two mating split-blocks. The beamleads are also expected to help in handling the finline circuit during assembly, which may have a thin layer of gold on a 1 μm thick SOI substrate.

For some embodiments, the main through-arm of the OMT at the input port is a square waveguide of dimension 150 μm by 150 μm, with a tapered waveguide-to-finline transition, and the finline mode is taken through a 45° bend and out through a reduced height guide (the side-arm). It was found that a 45° finline bend minimized mode conversion, and improved cross-polarization performance.

Embodiment OMTs are expected to offer good performance from 1200 to 1800 GHz. The input match is approximately −20 dB across the band for both polarizations. The insertion loss is approximately 1.5 dB for the vertical polarization and approximately 0.6 dB for the horizontal polarization. Simulated isolation and cross-polarization levels for the OMT were found to be in the −50 dB range.

Figure 5:
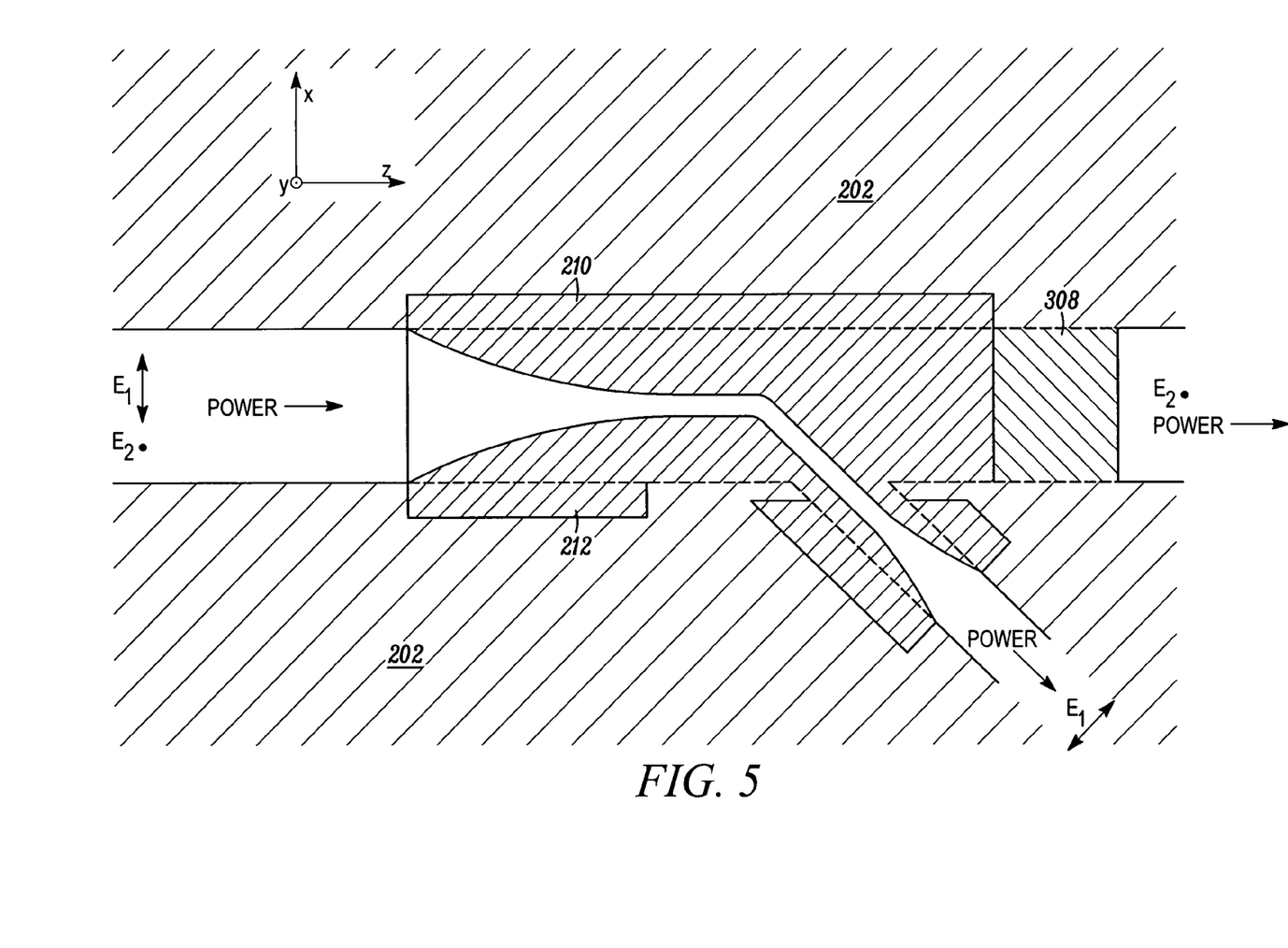
FIG. 5 illustrates a plan view of an ortho-mode transducer according to an embodiment.

FIG. 5 illustrates yet another view of OMT 104. FIG. 5 is a plan view of OMT 104, with fins 210 and 212 bonded on top of block 202. The dashed lines indicate the edges of waveguide 208. From the coordinate axes shown in FIG. 5 it is seen that the y-axis points out of the page of the illustration, and the polarizations of the electric fields are indicated. For simplicity, substrate 300 is not illustrated. FIG. 5 illustrates some of the points in the above discussion, showing the side-arm at about a 45° bend from the through-arm of the OMT to separate out $E_1$ from $E_2$, where $E_2$ propagates out along the through-arm.

Because the electromagnetic signals for the through-arm and side-arm have orthogonal polarizations, waveguide twist 220 may be used to bring the electromagnetic signal from the through-arm of the OMT (the vertically polarized received signal) to the same plane as the electromagnetic signal from the side-arm of the OMT (the horizontally polarized received signal), so that integration with the quadrature hybrids is easily facilitated. Waveguide twist 220 has a structure with stepped transitions to rotate the waveguide orientation for the vertically polarized received electromagnetic signal so that the signal becomes polarized in the horizontal direction.

Figure 6:
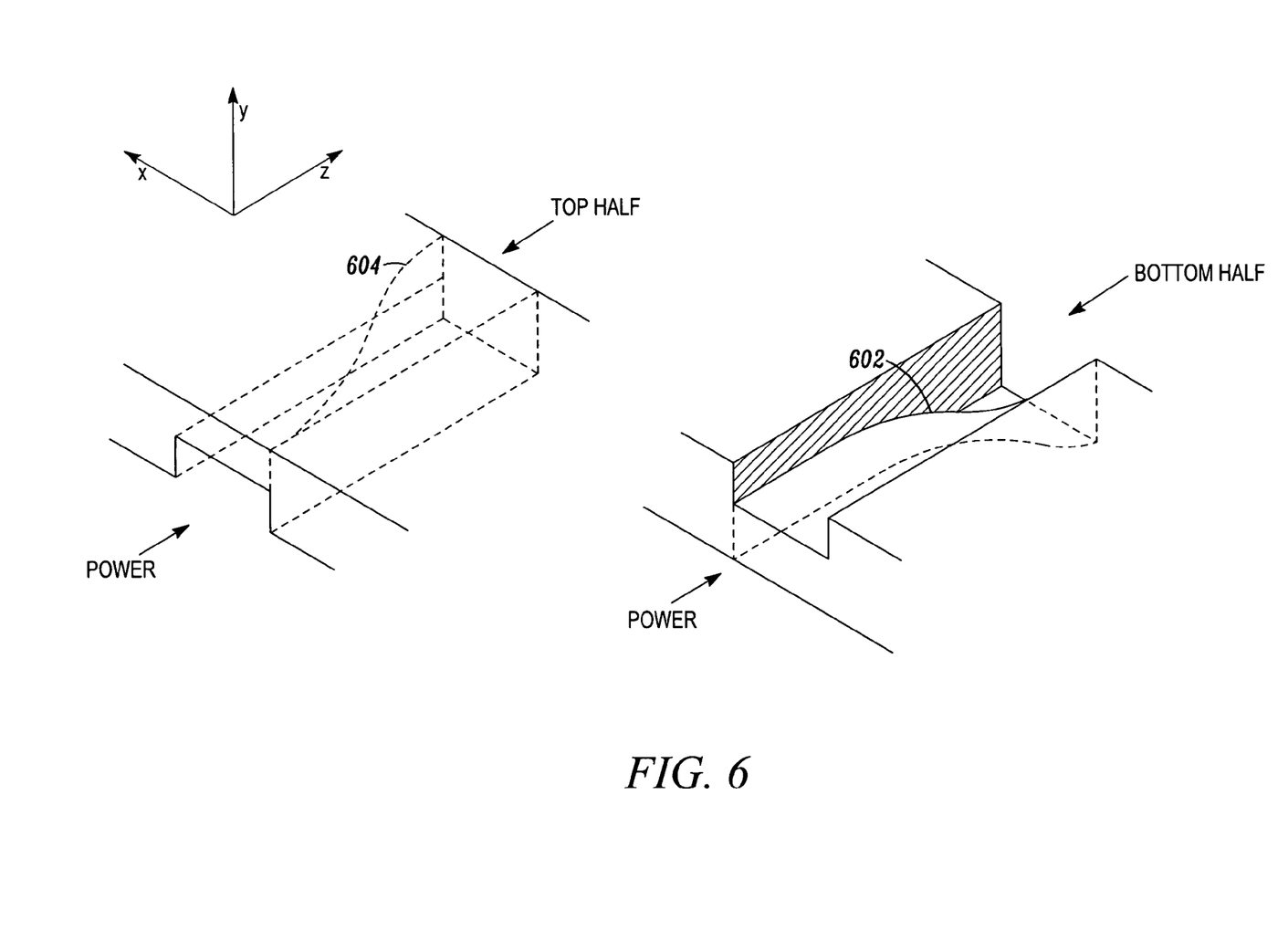
FIG. 6 illustrates a waveguide twist according to an embodiment.

FIG. 6 illustrates the bottom half and top half structures for waveguide twist 220 according to an embodiment, where a one step vertical (y-axis direction) transition is etched in the bottom half, and a one step vertical transition is etched in the top half. (The bottom and top halves are indicated in the illustration.) The input ports are denoted by an arrow denoting the power direction, along the z-axis. The orientation of the coordinate system in FIG. 6 is not necessarily the same as the coordinate system in the previous illustrations. The perspectives are not meant to be exact, but to illustrate the step transitions. The hatched area in the bottom half is meant to convey a visible vertical wall of the bottom etched structure. With the top half bonded to the bottom half, there are two steps in the vertical direction. Because there only two steps in the vertical direction with a curved waveguide profile in the horizontal (x-y) plane, it may be fabricated using the DRIE technique.

Figure 7A:
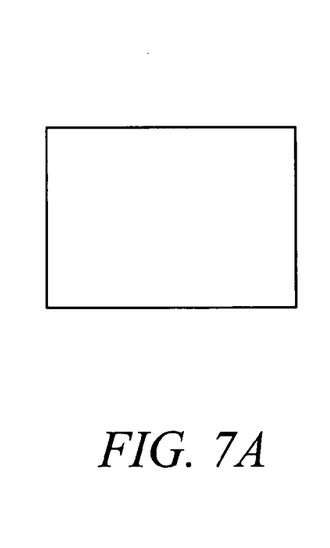
FIGS. 7A-7D illustrate cross sectional views of a waveguide twist according to an embodiment.
Figure 7B:
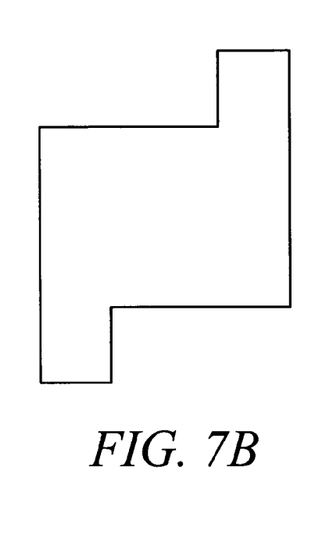
Figure 7C:
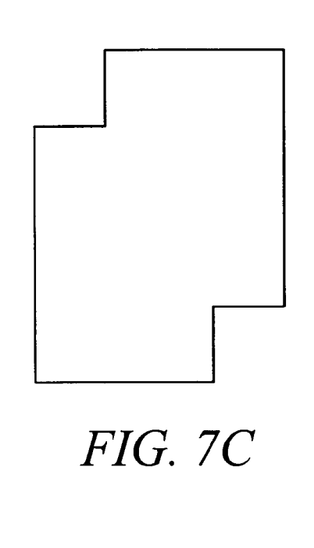
Figure 7D:
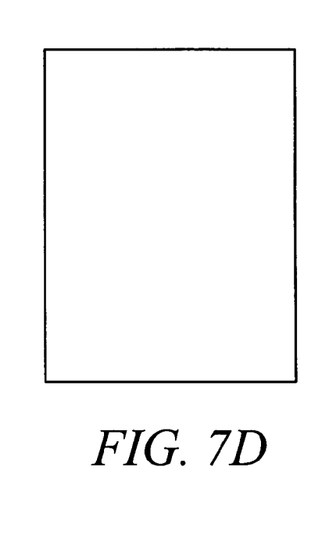

Lines 602 and 604 are meant to convey the edges of the vertical transitions for the bottom and top halves, respectively. A vertical transition etch has some relatively constant height in the y-axis direction, but where the width in the x-axis direction gradually increases from zero at the input port, to the full width at the output port. One way to view the top half is to rotate the bottom half about the z-axis by 180°. FIGS. 7A through 7B illustrate cross-sectional views of the waveguide twist illustrated in FIG. 6, where the coordinate system in FIGS. 7A-B has the same orientation as the coordinate system in FIG. 6. The views in FIGS. 7A-B are slices of the waveguide twist taken perpendicular to the z-axis. FIG. 7A illustrates the input port, and FIG. 7D illustrates the output port. FIGS. 7B and 7C illustrate two slices taken somewhere between the input and output ports.

FIG. 6 illustrates a waveguide twist comprising only one vertical transition for each half block. However, some embodiments may employ more than one vertical transition for each half block. For the top half block of such embodiments, the length of a vertical transition is less than the length of the vertical transition just below it. A similar remark applies to the bottom half block for such an embodiment.

As discussed previously, embodiments use waveguide quadrature hybrids for the balanced sideband-separating mixer designs. This architecture uses a total of three RF quadrature hybrids for each polarization; one for the sideband separation and one for each of the two balanced mixers. A waveguide form for a quadrature hybrid comprises two parallel waveguides coupled through a series of apertures or branch waveguides. Some embodiments may use this branch line coupler design because of its broad bandwidth, low loss, and compatibility with DRIE-micro-machined split blocks.

The amplitude and phase imbalance at the outputs of a quadrature hybrid may affect the local oscillator noise injection of the balanced mixer and the image rejection of the sideband separating mixer. A design goal should be to develop waveguide quadrature hybrids with less than 1.5 dB of amplitude imbalance and less than a few degrees of phase imbalance over a wide frequency band at terahertz frequencies.

Figure 8:
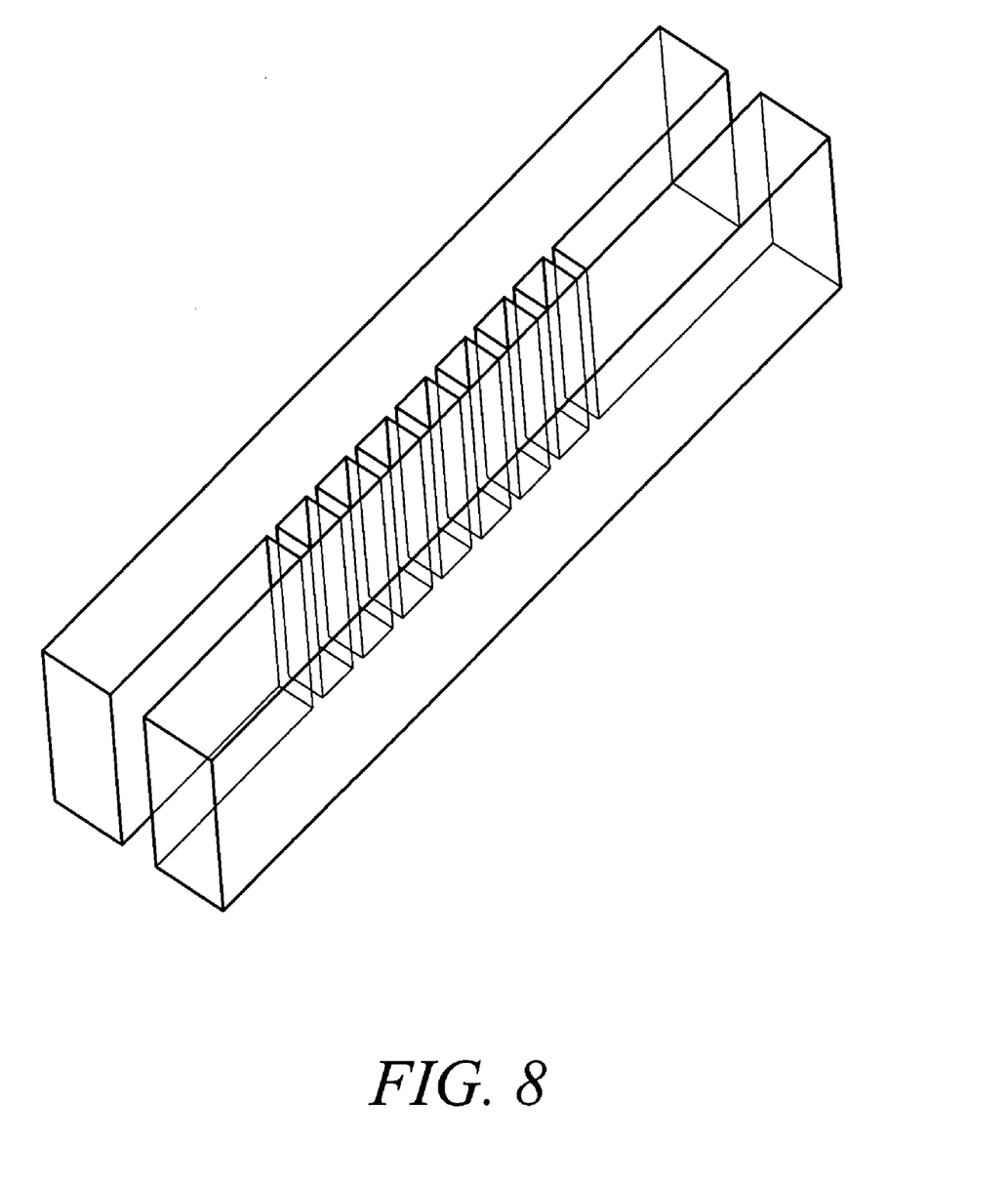
FIG. 8 illustrates a quadrature hybrid according to an embodiment.

Important design parameters for the hybrid are the width of the branch guides, the spacing of the branches, and the branch separation distance. For some embodiments, the design has branch guide widths in the 10 to 20 μm range, the spacing of the branches in the 30 to 60 μm range, and the branch separation distance approximately 55 μm. FIG. 8 provides a wire-grid illustration of an embodiment waveguide quadrature hybrid.

As discussed previously, various receiver components may be fabricated using DRIE techniques. DRIE of silicon has become an important technology process in micro-fabricating components which range in depth from 10 μm to greater than 1 mm. There are various well-known methods one may employ for DRIE. A popular method is commonly known as the "Bosch" process. See, for example, U.S. Pat. No. 5,501,893, "Method of Anisotropically Etching Silicon, by F. Laermer and A. Schilp. This is a dry process, compared to other deep etching techniques which rely on anisotropic wet chemistry. The Bosch process uses the deep reactive ion etching technique and does not appear to be sensitive to crystallographic orientation, and this process may have a very high selectivity to the masking material. This process is also believed to be considerably safer than the equivalent wet process.

The DRIE process uses a fluorine based gas chemistry (sulfur hexafluoride, $SF_6$) to etch the silicon, combined with a fluorocarbon process (octofluorocyclobutane-$C_4F_8$) to provide sidewall passivation and improved selectivity to the masking material. A complete etch process cycles between etch and deposition steps many times to achieve deep, vertical etch profiles.

Some embodiments were developed using the following DRIE fabrication method for developing silicon micro-machined components. A high resistivity silicon wafer is coated with a 5 μm thick layer of SJR-5740 positive photo resist (a product of MicroChem Corp.), and exposed for approximately 40 seconds using a 25 W-cm$^{-2}$ 320 nm ultraviolet (UV) light. The waveguide etching mask is aligned with a Karl-Suss MA6 aligner, followed by developing in a mixture of AZ400K (a product of AZ electronic materials) and de-ionized water in a 1:3 ratio until the pattern clears. The wafer is then mounted on a backing wafer using a crystal bond. The etching rate is approximately 2 µm/min, and achieves a uniformity of about ±10% across the wafer. The second step is similar to the first, with the exception that extra precaution should be used while coating resist onto the backside. This is because the high resistivity silicon wafer is brittle, and the first DRIE step makes it thinner. A standard blue masking sheet may be used to cover the etched side, and may be removed immediately after coating the resist. The second etch is a through wafer etching step, and the final parts are released in acetone.

Fabrication tolerances for horn 102 and OMT 104 assembly are not expected to be necessarily stringent because there are no tuning structures for these devices. Alignment crosses should be etched into the silicon structure to facilitate assembly. For some embodiments, after a DRIE etch, the silicon waveguide split-block halves (blocks 202 and 204) are gold plated with an e-beam evaporator, after masking off the alignment marks. Bonding is not necessary to hold the finline chip with its beamleads. Alignment of the top split-block with the bottom half may be achieved with an infrared semiconductor alignment tool, also known as flip-chip bonder. This tool holds both the top and bottom halves of the chip in air chucks on precision motion stages. An infrared microscope looks through the transparent silicon at the location of the alignment crosses to allow registration of the top and bottom halves of the structures. The air chucks then clamp the halves together with the Van der Waals forces bonding the gold metallization layers of the split-blocks. The silicon blocks may be glued and clamped into a copper fixture for testing.

Various modifications may be made to the described embodiments without departing from the scope of the invention as claimed below.

What is claimed is:

1. An apparatus comprising:
    a dielectric substrate having a first edge and a second edge;
    a first planar conductive fin deposited on the substrate, and having a portion extending over the first edge of the substrate;
    a second planar conductive fin deposited on the substrate, and having a portion extending over the second edge of the substrate, so that a gap is formed between the first and second conductive fins and adjacent to the dielectric substrate; and
    a first substrate comprising a conductive surface having a first trench, the first trench having a through-arm having a first end and a second end, and the first trench having a side-arm extending away from the through-arm at a side position between the first and second ends of the through-arm, the side-arm having an end;
    wherein the portions of the first and second planar conductive fins extending over the first and second edges of the dielectric substrate are adjacent to the first substrate such that the dielectric substrate and the gap are positioned over the first trench.

2. The apparatus as set forth in claim 1, the gap transitioning from a first wide width over the first end of the through-arm to a narrow width over the side position, and transitioning to a second wide width positioned over the end of the side-arm.

3. The apparatus as set forth in claim 2, further comprising:
    a second substrate comprising a conductive surface having a second trench, the second trench having a through-arm having a first end and a second end, and the second trench having a side-arm extending away from the through-arm of the second trench at a side position between the first and second ends of the through arm, the side-arm of the second trench having an end;
    wherein the second substrate is adjacent to the first substrate so that the first and second trenches form a waveguide, wherein the first ends of the straight-through arms of the first and second trenches form an input port to the waveguide, the second ends of the straight-through arms of the first and second trenches form a first output port of the waveguide, and the ends of the side-arms of the first and second trenches form a second output port to the waveguide.

4. The apparatus as set forth in claim 3, the first and second substrates each comprising silicon, where their conductive surfaces are formed by depositing metallization on the silicon.

5. The apparatus as set forth in claim 3, the dielectric substrate comprising a material selected from the group consisting of Gallium Arsenide and silicon-on-insulator.

6. The apparatus as set forth in claim 3, further comprising:
    a resistive material deposited on the dielectric substrate adjacent to the first and second planar conductive fins, positioned near the second ends of the straight-arms of the first and second trenches.

7. The apparatus as set forth in claim 6, wherein the input port has a square profile.

8. The apparatus as set forth in claim 7, wherein for a $TE_{10}$ mode propagating into the input port with a transverse electric field vector polarized in a direction parallel to the planar conductive fins, the $TE_{10}$ transitions into a finline mode near the narrow width of the gap, and transitions into a $TE_{10}$ mode at the second output port with a transverse electric filed vector polarized in a direction parallel to the planer conductive fins.

9. The apparatus as set forth in claim 8, wherein a $TE_{10}$ mode propagating into the input port with a transverse electric field vector polarized in a direction perpendicular to the planar conductive fins exits the first output port essentially unperturbed.

10. The apparatus as set forth in claim 1, the first substrate having a third trench having a first end and a second end, the second substrate having a fourth trench having a first end and a second end, so that the third trench and the fourth trench form a waveguide having an input port and an output port, the input port of the waveguide coupled to the first output port, where the first ends of the third and fourth trenches form the input port of the waveguide having a rectangular shape with an input width and an input height, and the second ends of the third and fourth trenches form the output port of the waveguide having a rectangular shape with an output width and an output height, where the output height is greater than the input height, the waveguide having a first vertical step with a width that transitions from zero at the input port of the waveguide to the output width at the output port of the waveguide, and the waveguide having a second vertical step with a width that transitions from zero at the input port of the waveguide to the output width at the output port of the waveguide.

11. An apparatus comprising:
    an ortho-mode transducer comprising:
        first and second substrates each having a conductive surface such that when coupled together form a waveguide comprising an input port; a first output port; and a second output port;
        a dielectric substrate; and
        a pair of planar fins deposited on the dielectric substrate and bonded to the first and second substrates, the pair of planar fins forming a gap such that a $TE_{10}$ mode with an electric field vector polarized parallel to the planar fins and propagating into the input port transitions to a finline mode and then propagates out of the second output port, and a $TE_{10}$ mode with an electric field vector polarized perpendicular to the planar fins and propagating into the input port propagates out of the first output port.

12. The apparatus as set forth in claim 11, the first and second substrates each comprising silicon having deposited metallization to form the conductive surfaces.

13. The apparatus as set forth in claim 11, the dielectric substrate comprising a material selected from the group consisting of Gallium Arsenide and silicon-on-insulator.

14. The apparatus as set forth in claim 11, further comprising:
   a waveguide having an input port coupled to the first output port of the ortho-mode transducer, and having an output port, the input port having a rectangular shape with an input width and an input height, and the output port having a rectangular shape with an output width and an output height, where the output height is greater than the input height, the waveguide having a vertical step with a width that transitions from zero at the input port to the output width at the output port.

15. An apparatus comprising:
   a first substrate having a conductive surface, the first substrate having a first trench having a first end and a second end; and
   a second substrate having a conductive surface, the second substrate having a second trench having a first end and a second end, so that the first trench and the second trench form a waveguide having an input port and an output port, where the first ends of the first and second trenches form the input port of the waveguide having a rectangular shape with an input width and an input height, and the second ends of the first and second trenches form the output port of the waveguide having a rectangular shape with an output width and an output height, where the output height is greater than the input height, the waveguide having a first vertical step with a width that transitions from zero at the input port of the waveguide to the output width at the output port of the waveguide, and the waveguide having a second vertical step with a width that transitions from zero at the input port of the waveguide to the output width at the output port of the waveguide.

* * * * *